United States Patent [19]
Fay

[11] 3,734,248
[45] May 22, 1973

[54] FLOATING CALIPER ASSEMBLY FOR DISTRIBUTION OF BRAKE SHOE THRUST IN DUAL HYDRAULIC BRAKE SYSTEM

[76] Inventor: Clarence C. Fay, 17211 Edgewater Drive, Lakewood, Ohio 44107

[22] Filed: Dec. 1, 1971

[21] Appl. No.: 203,696

[52] U.S. Cl..............188/345, 60/54.6 M, 188/72.4, 188/73.3
[51] Int. Cl. .............................................B60t 11/20
[58] Field of Search...................188/73.3, 72.4, 72.5, 188/106 P, 365, 370; 60/54.6 M

[56] References Cited
UNITED STATES PATENTS

| | | | |
|---|---|---|---|
| 3,375,906 | 4/1968 | Hayes | 188/73.3 |
| 3,456,766 | 7/1969 | Beller | 188/106 P X |
| 2,711,802 | 6/1955 | Davis | 188/72.4 X |
| 2,926,757 | 3/1960 | Armstrong | 188/73.3 |
| 2,951,561 | 9/1960 | Davis | 188/72.5 |
| 3,371,749 | 3/1968 | Lucien et al. | 188/106 P X |

*Primary Examiner*—George E. A. Halvosa
*Attorney*—Harold F. McNenny et al.

[57] ABSTRACT

There is provided an improved floating caliper assembly for disc brakes which is especially adapted for use in dual hydraulic brake systems having first and second independent hydraulic subsystems, and which assembly is characterized by a stationary adaptor including guide means, a floating caliper mounted on the guide means, the caliper including a housing portion having at least three isolated cylindrical bores open at one end and disposed on parallel axes and a disc-spanning arm portion having a free distal extremity. A piston is mounted in each of the cylindrical bores and defines an internal variable volume hydraulic fluid chamber with the housing. The outer ends of the pistons extend beyond the housing. A first disc brake shoe is provided for coaction with one side of a disc and mounted on the free extremity of the disc-spanning arm. A second disc brake shoe is positioned for coaction with the opposite side of the disc and guided by the guide means for abutting coaction with the outer faces of the pistons. Introduction of fluid into the variable volume hydraulic fluid chambers causes the brake shoes to move in opposition to each other and clasp the disc therebetween for braking action. Means are provided for introducing fluid from separate hydraulic subsystems into the variable volume chambers in such a way that in the event only one subsystem is operative, the distribution of thrust through the caliper assembly is uniform.

4 Claims, 4 Drawing Figures

Patented May 22, 1973

FLOATING CALIPER ASSEMBLY FOR DISTRIBUTION OF BRAKE SHOE THRUST IN DUAL HYDRAULIC BRAKE SYSTEM

BACKGROUND OF THE INVENTION AND PRIOR ART

Safety standards for automotive vehicles, especially as they relate to brake systems, have now evolved to the dual hydraulic system which ensures that in the event of failure of one of the hydraulic subsystems, the vehicle is not without brakes. A number of arrangements utilizing two isolated hydraulic sybsystems has been proposed including (a) one subsystem operating only the front brakes and the other only the rear brakes (2 + 2); (b) one sub-system operating left front and right rear brakes and the other, right front and left rear (2 × 2); (c) one subsystem operating all four brakes and the other the front brakes only (4 + 2); (d) one subsystem operating both front brakes and the left rear and the other operating both front brakes and the right rear (3 + 3); and (e) each subsystem operating all four brakes (4 + 4). Where a given brake is common to both subsystems as in (c), (d), and (e), it has been practice to operate such common brakes as a "half brake" utilizing separate pairs of calipers in disc brakes to accommodate both subsystems.

The present invention provides an improved caliper of the floating type for use with disc brakes in dual hydraulic systems, especially of the (c), (d), and (e) types.

The improved floating-type calipers of the present invention are most effective in a 4 + 4-type automotive brake system wherein all four wheels include disc brakes and wherein the hydraulic subsystems are fully redundant.

In attempting to design a caliper assembly of the floating type for use with disc brakes, one is confronted with an extreme problem posed by the manner in which the brake shoes or pads engage the disc. For proper operation, these shoes or pads must engage the disc so that the brake lining material presses against the disc from each side with substantially uniform pressure and also with the confronting faces of the disc and the brake lining material being in parallel relationship. To adapt disc brakes to a dual hydraulic system, one can, of course, supply two separate calipers for each disc, one caliper apparatus coating with one hydraulic subsystem and the second caliper apparatus coacting with the second hydraulic subsystem. Such a solution to the problem not only multiplies the expense but may in certain instances be impossible because of the space requirements for wheel suspension.

Also, it is not simply a question of utilizing separate cylinders for each hydraulic subsystem in a single caliper apparatus. If only two piston/cylinder assemblies are utilized in side-by-side relationship, whether on a vertical axis or on a horizontal axis, in the event of failure of one hydraulic subsystem, the pressure which will be applied to the remaining subsystem will be eccentric to the normal application of force to the brake shoe. This results in the problem of cocking of the disc-engaging brake shoe which in the case of a single piston/cylinder assembly is bad enough without being complicated by inclusion in a dual system. The present invention overcomes the problem by supplying at least three piston/cylinder assemblies disposed in such a way that the mode of coaction of the brake shoes with the disc is essentially the same whether the brake shoes are being actuated by two fully operative hydraulic subsystems or by either one of them.

BRIEF STATEMENT OF THE INVENTION

Briefly stated, the present invention is in an improved floating caliper assembly for disc brakes. The assemblies of the present invention are characterized by a stationary adaptor including guide means carried thereby. A floating caliper is mounted on said guide means, said caliper including a piston housing portion having at least three isolated cylindrical portions open at one end and disposed on parallel axes, and a disc-spanning arm portion having a free distal extremity. Pistons are mounted in each of the cylindrical bores in the housing and define therewith at the interfaces variable volume hydraulic fluid chambers. The outer faces of the pistons extend beyond the housing. A first disc brake shoe is provided for balanced thrust coaction with one side of a disc and is mounted on the free extremity of said arm and guided by the guide means. A second disc brake shoe is provided for balanced thrust coaction with the opposite side of a disc, and guided by the guide means for abutting coaction with the outer faces of the pistons. Means are provided for conducting fluid into and out of the variable volume hydraulic fluid chambers and communicating separately with the first and second hydraulic subsystems of a dual hydraulic brake system.

BRIEF DESCRIPTION OF THE DRAWINGS

The invention may be better understood by having reference to the annexed drawings wherein.

DETAILED DESCRIPTION OF THE DRAWINGS

Figure 1:
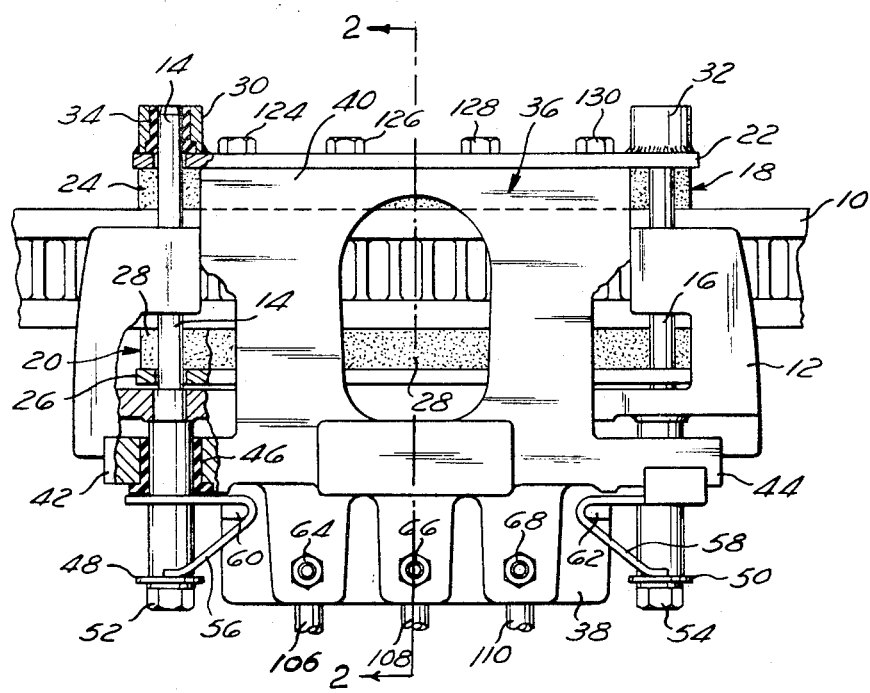
FIG. 1 is a top elevation, partially cut away, of a floating caliper assembly in accordance with the present invention.

Referring now more particularly to FIG. 1, there is here shown, partially cut away, a floating caliper assembly for a disc brake embodying the structure of the present invention. A ventilated disc 10 of conventional structure is provided and mounted on a wheel in a known manner. The caliper assembly of the present invention includes an adaptor 12 which is stationary and mounted on a flange carried by the axle housing as will be mentioned with reference to FIG. 2. The adaptor includes guiding means preferably in the form of stationary guide pins 14 and 16 which are mounted on parallel axes and span the disc 10. The guide pins 14 and 16 aid in the assembly and maintenance of alignment of disc brake shoe assemblies 18 and 20. The brake shoe assembly 18 is composed of a backing plate 22 and a brake liner material 24 of known composition. In like manner, the brake shoe assembly 20 is composed of a backing plate 26 and a brake liner material 28. Brake liner or shoe 24 is provided with spaced collars 30 and 32 for containing a bushing such as bushing 34 adapted to receive pin 14 therein guiding the latter in a sliding manner therealong in response to hydraulic fluid movement. In like manner, the brake shoe assembly 20 is also guided on pins 14 and 16. A floating caliper member generally indicated at 36 is provided with a piston housing portion 38, and integral therewith is a disc-spanning arm 40. The disc-spanning arm 40 is provided with laterally extending members 42 and 44 suitably bored and bushed as with bushing 46 to accept an enlarged diameter portion of pins 14 and 16 therein. The innermost extremities of pins 14 and 16 are shouldered and threaded to accept washers 48 and 50 retained in place by nuts 52 and 54. Resilient members 56 and 58 coact between the washers 48 and 50, respectively, and urge the members supporting the brake shoes 18 and 20 in opposite directions out of engagement with the disc 10. The housing 38 is provided with projections 60 and 62 integral therewith to aid in retaining the resilient members 56 and 58. Bleeder screws 64, 66, and 68 are provided for expelling entrapped gases from the variable volume chambers within the housing 38 hereinafter described. Inlet lines 106, 108, and 110 are provided for introducing hydraulic fluid into and conducting fluid away from the variable volume chambers within the housing 38. In the embodiment shown in FIG. 3, inlet lines 106 and 110 are joined by a common header and connected to one of the hydraulic subsystems of a dual braking system, and central inlet line 108 is connected to a second hydraulic subsystem isolated from the first.

Figure 2:
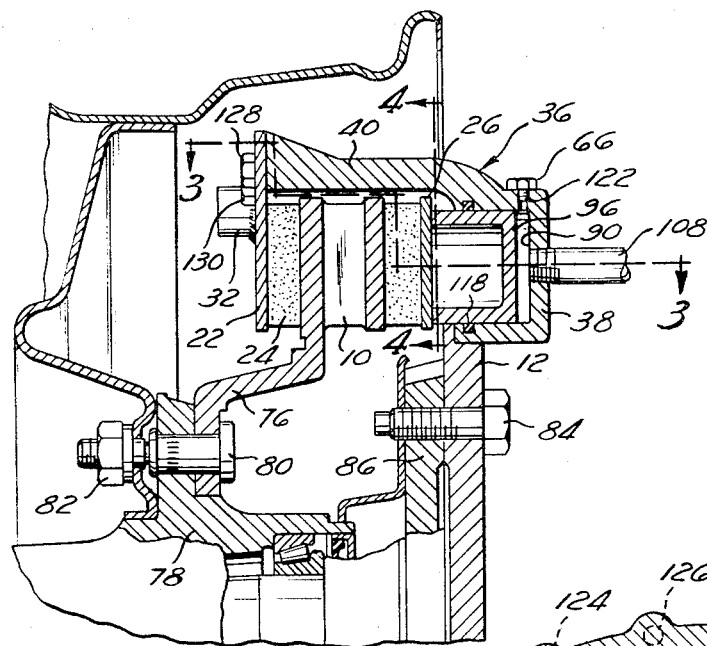
FIG. 2 is a cross-sectional view of the floating caliper assembly shown in FIG. 1 as it appears in the plane indicated by the line 2—2 in FIG. 1 and showing, additionally, the mounting of the disc and the adaptor assembly onto an automotive vehicle wheel and axle housing, respectively.
Figure 3:
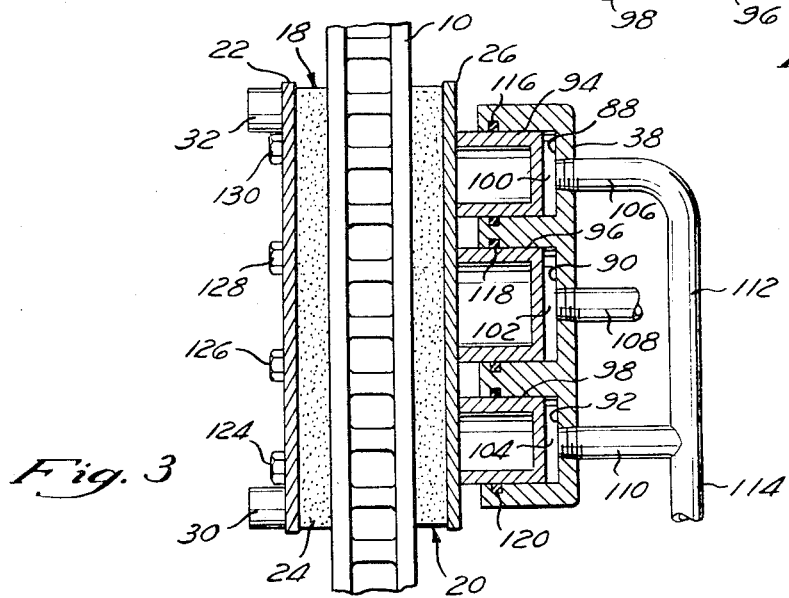
FIG. 3 is a cross-sectional view of the apparatus shown in FIG. 2 as it appears in the broken plane indicated by the line 3—3 in FIG. 2.

Referring now more particularly to FIG. 2, the disc 10 includes an offset flange portion 76 for mounting on a wheel 78 such as an automotive vehicle wheel as by means of bolts, e.g. bolt 80 secured by nut 82 in a conventional manner. The adaptor 12 is held by means of bolts such as bolt 84 to a spider 86 which is integral with the axle housing of the vehicle and provides a convenient means for mounting the floating caliper appratus. As shown in FIGS. 2 and 3, the floating caliper 36 is composed of a piston housing portion 38 and a disc-spanning arm 40. The housing 38 is provided with three cylindrical bores 88, 90, and 92 which are closed at one end and have their axes parallel to each other. There are disposed within each of the cylinder bores 88, 90, and 92 pistons 94, 96, and 98, respectively. The inner ends of the pistons define with the respective cylinder head portions of housing 38 variable volume hydraulic fluid chambers 100, 102, and 104. Means are provided for introducing fluid into and conducting fluid away from variable volume chambers 100, 102, and 104 in the form of conduits 106, 108, and 110. The outermost conduits 106 and 110 supplying variable volume hydraulic fluid chambers 100 and 104, respectively, are joined by a common header portion 112 which also communicates with a conduit portion 114 which is directly connected to one of the two hydraulic subsystems in a dual braking system for an automotive vehicle. The fluid conduit 108 supplies fluid to and carries fluid away from centrally located variable volume chamber 102. The conduit 108 is directly attached to the second of the two hydraulic subsystems in an automotive vehicle. Thus, if the first hydraulic subsystem encounters failure, the second hydraulic subsystem which is isolated from the first throughout its entire course will supply fluid to the central variable volume chamber 102 and effect operation of the disc brake.

Likewise, if the second subsystem encounters failure, the first subsystem supplying pressurized fluid through conduit 114, header 112, and inlets 106 and 110 to the outermost variable volume hydraulic fluid chambers 100 and 104 will impose a balanced thrust upon the brake shoe 20.

In order to transmit the force from the hydraulic fluid chambers 100, 102, and 104 to the brake shoe assembly 20, the outer extremities of the pistons 94, 96, and 98 extend beyond the housing 38 and are adapted for abutting engagement with backing plate 26. Suitable seals such as seals 116, 118, and 120 are provided between the cylinder wall and the pistons. In order to provide for removal of entrapped gases within the variable volume chambers 100, 102, and 104, suitable bleeders such as bleeder 122 are provided.

Again referring to FIG. 2, the distal extremity of the arm 40 is drilled and tapped to receive bolts 124, 126, 128 and 130 for mounting the backing plate 22 supporting brake liner 24 for operative braking coaction with the disc 10. It should be noted that the configuration of the disc-spanning arm 40 is desirably such as to permit direct boring access to the housing portion 38 for provision of the cylindrical bores 88, 90, and 92. The preferred removable end avoids a hook member for retention of the brake shoe 18 which hook member would otherwise interfere with ready access to the cylindrical bores and removal of the wheel with the disc.

Figure 4:
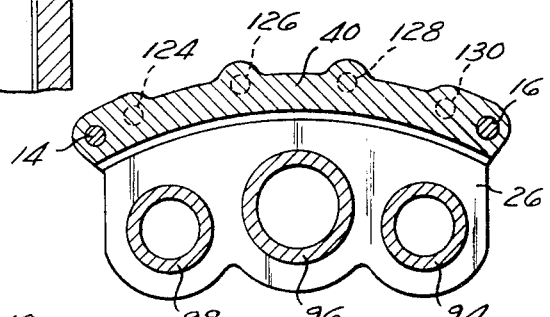
FIG. 4 is a cross-sectional view of the apparatus shown in FIG. 2 as it appears in the plane indicated by the line 4—4.

Also as best shown in FIG. 4, the axes of the cylindrical bores and pistons 94, 96, and 98 are desirably disposed upon an arc of a circle, the center of which is located at or close to the center of the disc 10. Also in the preferred embodiment, the cross-sectional area of the variable volume chamber 102 is equal to the summation of the cross-sectional areas of the variable volume chambers 100 and 104.

The floating caliper assemblies of the present invention are mounted in a known manner for coaction with a rotating member, e.g. disc 10. Depending upon the type of the dual hydraulic braking system employed as above described, two or more of the devices of the present invention may be used in combination with conventional floating caliper assemblies. The balance of the brake system desirably includes a dual master hydraulic actuator which may be of the tandem type or of the type described in my U.S. Pat. Nos. 3,336,597 dated Aug. 15, 1967; 3,370,426 dated Feb. 27, 1968; 3,406,522 dated Oct. 22, 1968; and 3,530,670 dated Sept. 29, 1970. In combination with the improved floating caliper assemblies of the present invention, the dual master hydraulic actuators of the foregoing patents have the ability to provide a substantial increase in the fluid pressure within the remaining subsystem upon failure of one subsystem. With the area relationships in the preferred embodiment as above described and the symmetrical disposition of the piston/cylinder assemblies associated with the respective hydraulic subsystems vis-a-vis the brake shoe backing plate 26, the effect of this apparent increase in line pressure in the remaining hydraulic subsystem when applied from the centrally located piston cylinder assembly is about equal to the pressure which is availble when both hydraulic subsystems are fully operative. In like manner, should the hydraulic subsystem supplying the outermost piston/cylinder assemblies be the one which remains intact, then the pressure supplied to the brake shoe 20 will again be about the same as if all three piston/cylinder assemblies were operative. The manner of operation of a floating caliper disc brake-actuating assembly is well known and need not be further explained here.

There has thus been provided an improved floating caliper assembly for use with dual hydraulic brake systems as currently required by federal safety regulations concerning automotive brakes. These devices avoid the problems of misalignment of the brake shoes relative to the rotating disc and also effect a considerable saving over that which is required to provide completely redundant and separate floating caliper assemblies, one for each of the two hydraulic subsystems. The space requirements of the devices of the present invention are not such as to interfere with conventional wheel suspension apparatus.

What is claimed is:

1. A floating caliper assembly for a disc brake comprising in combination:
   a. a stationary adaptor including guide means carried thereby;
   b. a floating caliper mounted on said guide means, said caliper including:
      1. a piston housing portion for disposition on one side of a brake disc and having at least three symmetrically disposed isolated cylindrical bores closed at one end and disposed on parallel axes, and
      2. a disc-spanning arm portion having a free distal extremity;
   c. a piston mounted in each of said cylindrical bores in said housing and defining therewith at its inner face a variable volume hydraulic fluid chamber, and having the outer face extending through the open end of said cylindrical bore and movable toward and away from said one side of a brake disc;
   d. a first disc brake shoe for balanced thrust coaction with the opposite side of said disc and mounted on the free extremity of said arm guided by said guide means;
   e. a second disc brake shoe for opposing balanced thrust coaction with said one side of said disc and guided by said guide means for abutting coaction with the outer faces of said pistons; and
   f. balanced isolated means for conducting hydraulic fluid into and out of said variable volume hydraulic fluid chambers including a common header joining the outermost cylindrical bores for conducting fluid into and out of said outermost cylindrical chambers, and separate means for conducting fluid into and out of the balance of said chambers, the total of cross-sectional areas of the outermost chambers and the total of the cross-sectional area of the balance of said chambers, respectively, being equal.

2. A floating caliper assembly for a disc brake in accordance with claim 1 wherein the guide means includes a pair of parallel guide pins.

3. A floating caliper assembly for a disc brake in accordance with claim 1 wherein the parallel axes of said cylindrical bores lie on a circular arc.

4. A floating caliper assembly for a disc brake in accordance with claim 1 also including means for bleeding each of said variable volume hydraulic fluid chambers.

* * * * *